(12) United States Patent
Juby et al.

(10) Patent No.: US 7,487,179 B2
(45) Date of Patent: Feb. 3, 2009

(54) METHOD AND PROGRAM PRODUCT FOR AUTOMATING THE SUBMISSION OF MULTIPLE SERVER TASKS FOR UPDATING A DATABASE

(75) Inventors: Duncombe A. Juby, Treillieres (FR); Jeffrey R. Putman, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/345,258

(22) Filed: Jan. 31, 2006

(65) Prior Publication Data
US 2007/0179931 A1   Aug. 2, 2007

(51) Int. Cl.
*G06F 7/00* (2006.01)
(52) U.S. Cl. .................................. 707/104.1; 707/101
(58) Field of Classification Search .................. 707/100, 707/104.1, 101
See application file for complete search history.

(56) References Cited

U.S. PATENT DOCUMENTS

| | | | |
|---|---|---|---|
| 5,706,431 A * | 1/1998 | Otto ............................ 709/221 |
| 6,094,654 A | 7/2000 | Van Huben et al. | |
| 6,615,258 B1 * | 9/2003 | Barry et al. .................. 709/223 |
| 6,892,204 B2 | 5/2005 | Haas et al. | |
| 6,898,587 B2 | 5/2005 | Messinger | |
| 7,100,195 B1 * | 8/2006 | Underwood .................... 726/2 |
| 2002/0069279 A1 * | 6/2002 | Romero et al. ............... 709/225 |
| 2002/0087694 A1 * | 7/2002 | Daoud et al. ................. 709/226 |
| 2002/0168621 A1 * | 11/2002 | Cook et al. ................... 434/350 |
| 2003/0158913 A1 * | 8/2003 | Agnoli et al. ................ 709/219 |
| 2003/0177503 A1 * | 9/2003 | Sull et al. ..................... 725/112 |
| 2005/0044165 A1 * | 2/2005 | O'Farrell et al. ............. 709/213 |
| 2005/0075115 A1 * | 4/2005 | Corneille et al. ......... 455/456.3 |
| 2005/0198085 A1 * | 9/2005 | Blakey et al. ................ 707/204 |
| 2006/0041598 A1 * | 2/2006 | Yamaguchi et al. .......... 707/200 |

* cited by examiner

*Primary Examiner*—Hung Q Pham
*Assistant Examiner*—Linh Black
(74) *Attorney, Agent, or Firm*—Silvy A. Murphy (57) ABSTRACT

A method for updating data in a database is provided. The method comprises initiating a plurality of tasks adapted to update data in the database, wherein the plurality of tasks run substantially contemporaneously. The method further comprises automating a collection of statistics associated with and subsequent to completing a first batch of the plurality of tasks running to completion, wherein the collection of statistics optimize performance of any remaining batches of the plurality of tasks running to completion. Further, the method comprises automatically submitting a next task of the plurality of tasks when a task of the plurality of tasks has been processed, until each of the plurality of tasks has been processed for updating the data in the database. Additionally, the method comprises generating a log file summarizing an outcome for each of the tasks subsequent to completion of all tasks of the plurality of tasks.

12 Claims, 9 Drawing Sheets

METHOD AND PROGRAM PRODUCT FOR AUTOMATING THE SUBMISSION OF MULTIPLE SERVER TASKS FOR UPDATING A DATABASE

FIELD OF THE INVENTION

The present invention relates to a method for updating data in a database. More particularly, the present invention relates to a method of automating the submission of multiple server tasks to be processed substantially simultaneously for updating data in a database.

BACKGROUND OF THE INVENTION

In today's business environment, organizations and/or businesses utilize a variety of database systems to store a collection of data. Each of the database systems may utilize a different database structure or schema and, accordingly, database management systems are needed to manage and query data stored in these databases. Moreover, given the difference in schemas from one database to another, often, database administrators and programmers need to manually manage the data contained within these databases despite the availability of database management systems. As such, it has become imperative that organizations and/or businesses examine the efficiency and effectiveness of database management in terms of resources consumed, such as, storage and/or memory required as well as time spent by personnel within these organizations and/or businesses in managing the data in these databases. Accordingly, there exists a need in the art to simplify the process of managing data in databases while controlling the costs associated with such database management systems.

SUMMARY OF THE INVENTION

In one aspect of the invention, there is provided a method for updating data in a database. The method comprises initiating a plurality of tasks adapted to update data in the database, such that, the plurality of tasks are run substantially contemporaneously. Preferably, the initiating step comprises testing whether one or more parameters for the plurality of tasks are passed as arguments, and, if so, checking whether the one or more parameters exist before initiating the plurality of tasks. More preferably, the initiating step comprises running a first script that invokes a second script, such that the plurality of tasks run substantially contemporaneously until each of the plurality of tasks has run to completion for updating the data in the database. The method further comprises automating a collection of statistics associated with and subsequent to completing a first batch of the plurality of tasks running to completion, such that the collection of statistics optimize performance of any remaining batches of the plurality of tasks running to completion. Further, the method comprises automatically submitting a next task of the plurality of tasks when a task of the plurality of tasks has been processed, until each task of the plurality of tasks has been processed for updating the data in the database. Preferably, the automatically submitting step comprises the first script managing queuing of the next task of the plurality of tasks when a number of tasks running is less than a number of tasks to be run substantially contemporaneously, and the second script submitting the next task of the plurality of tasks when a total number of tasks running on the server is less than a maximum number of tasks that the server can run, such that the each of the plurality of tasks are run to completion. Additionally, the method comprises generating a log file summarizing an outcome for each task of the plurality of tasks subsequent to completion of all tasks of the plurality of tasks. Preferably, the database is a Siebel database, and preferably, the plurality of tasks comprises at least one of import, export, delete, merge and update.

In another aspect of the invention, there is provided a method of providing a service for manipulating data in a database, the method comprises providing a first script configured to manage queuing a plurality of tasks to be processed substantially simultaneously, and providing a second script configured to submit the plurality of tasks substantially simultaneously for manipulating the data in the database. The method further comprises configuring one or more parameters in the first script configured to manage queuing the plurality of tasks to be processed substantially simultaneously, and running the first script, which invokes the second script, such that a next task of the plurality of tasks is automatically submitted when one task of the plurality of tasks has been processed, until each task of the plurality of tasks is processed. Preferably, the one or more parameters in the first script comprises at least one of name of intermediary table in the database, driver file, batch range file, working directory file and configuration file. More preferably, the first script automates a collection of statistics associated with and subsequent to completing a first batch of the plurality of tasks running to completion, such that the statistics collected optimize performance of any remaining batches of the plurality of tasks running to completion. Further, preferably, the second script monitors a total number of tasks running on the server and submits the next task of the plurality of tasks when a total number of tasks running on the server is less than a maximum number of tasks that the server can run. Further, the method comprises generating a collective log file summarizing an outcome for each task of the plurality of tasks subsequent to completion of all tasks of the plurality of tasks. In a preferred embodiment, the generating step comprises creating an individual log file corresponding to the each task of the plurality of tasks subsequent to completion of the all tasks of the plurality of tasks, and identifying in the collective log file a summary for each of the individual log files created for the each task of the plurality of tasks subsequent to completion of the all tasks of the plurality of tasks. Preferably, the database is a Siebel database, and preferably, each of the first script and the second script is a korn shell script. Further, preferably, the plurality of tasks comprises at least one of import, export, delete, merge and update.

In yet another aspect of the invention, there is provided a computer program product for processing data in a database. The program product comprises a computer readable medium, first program instructions to initiate a plurality of tasks adapted to process data in the database, such that the plurality of tasks are running substantially contemporaneously. Preferably, the first instructions comprise instructions to test whether one or more parameters for the plurality of tasks are passed as arguments and to check whether the one or more parameters exist before initiating the plurality of tasks to be run substantially contemporaneously. Further, the computer program product comprises second program instructions to automate a collection of statistics associated with and subsequent to completion of a first batch of the plurality of tasks running to completion, wherein the statistics collected optimize performance of any remaining batches of the plurality of tasks running to completion, and third program instructions to automatically submit a next task of the plurality of tasks when one task of the plurality of tasks has been processed, until each task of the plurality of tasks is completed for processing the data in the database. Preferably, the third instructions comprise instructions to queue the next task of the plurality of tasks when a number of tasks running is less than the plurality of tasks to be run substantially contemporaneously and to start the next task of the plurality of tasks only when a total number of tasks running on the server is less than a maximum number of tasks that can run on the server, until each of the plurality of tasks are run to completion. Furthermore, the computer program product comprises fourth program instructions to generate a log file summarizing an outcome for each task of the plurality of tasks subsequent to completion of all tasks of the plurality of tasks, wherein the fourth program instructions are stored on the medium. Preferably, each of the first, second, third and fourth program instructions is stored on the medium. Preferably, the database is a Siebel database and the plurality of tasks comprises at least one of: import, export, delete, merge and update.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for updating data in a database. The method comprises initiating a plurality of tasks adapted to update data in the database, such that, the plurality of tasks are run substantially contemporaneously. Preferably, the initiating step comprises testing whether one or more parameters for the plurality of tasks are passed as arguments, and, if so, checking whether the one or more parameters exist before initiating the plurality of tasks. More preferably, the initiating step comprises running a first script that invokes a second script, such that the plurality of tasks are running substantially contemporaneously until each of the plurality of tasks has run to completion for updating the data in the database. The method further comprises automating a collection of statistics associated with and subsequent to completing a first batch of the plurality of tasks running to completion, such that the collection of statistics optimize performance of any remaining batches of the plurality of tasks running to completion. Further, the method comprises automatically submitting a next task of the plurality of tasks when a task of the plurality of tasks has been processed, until each task of the plurality of tasks has been processed for updating the data in the database.

Preferably, the automatically submitting step comprises the first script managing queuing of the next task of the plurality of tasks when a number of tasks running is less than a number of tasks to be run substantially contemporaneously, and the second script submitting the next task of the plurality of tasks when a total number of tasks running on the server is less than a maximum number of tasks that the server can run, such that the each of the plurality of tasks are run to completion. Additionally, the method comprises generating a log file summarizing an outcome for each task of the plurality of tasks subsequent to completion of all tasks of the plurality of tasks. Preferably, the database is a Siebel database, and preferably, the plurality of tasks comprises at least one of import, export, delete, merge and update.

As used herein, the term "EIM" or "EIM process" refers to an application program for updating data in a database, preferably, the commercially available Enterprise Integration Manager (EIM) application owned by Siebel Systems, Inc. for updating data in a base table of a Siebel® database. Siebel's Enterprise Integration Manager (EIM) application software is a component of Siebel's eBusiness server application owned by Siebel Systems, Inc. The EIM component (software) allows for bi-directional exchange of data between the Siebel database and other corporate databases. Siebel's EIM application is a suite of programs that is used to process raw data from an intermediary table (also referred to as an EIM table) before transferring the data into the Siebel base table. The Siebel database is made up of intermediary tables (EIM tables) and base tables. In order to load data into a Siebel base table, you first need to prepare an intermediary table (EIM table) and then populate the EIM table. Any kind of utility or process, such as, SQL (Structured Query Language) ancillary program utility or native SQL can be used to import external data into an EIM table and to export the data from the EIM table. In order to prepare and/or load the EIM tables in the Siebel database, you need to identify the data that is going to be processed by the EIM application. Once the data has been loaded into one or more EIM tables, the data can be loaded into the Siebel base table using the EIM application, which processes the data being loaded into the Siebel base tables. Moreover, the term "task" or "job" or "server task" or "EIM job" or "EIM task" refers to a server task that is run or submitted to the EIM application program, which performs the process of updating data in a Siebel® base table. Further, the term "plurality of tasks" refers to one or more tasks and, in particular, the total number of server tasks that are to be processed using the EIM process, whereas, the term "multiple tasks" refers to the one or more tasks of the plurality of tasks that are to be run substantially simultaneously. Furthermore, as used herein, the term "updating data" or "manipulating data" refers to updating or manipulating fields or columns in one or more records in a Siebel® base table, which is accomplished by processing the one or more server tasks using the EIM process. The different server tasks that can be performed by running the EIM component are import, export, merge, delete and update. The "import" task refers to the task of importing data from an EIM table to one or more Siebel base tables, whereas, the "export" task refers to the task of exporting data from one or more Siebel base tables to an EIM table. Although, data can be imported from another source into an EIM table and data can be exported from an EIM table to another source, as used herein the import and export process refers to the exchange of data between an EIM table and one or more Siebel base tables. In addition, the "update" task refers to the task of changing the values of existing data contained in one or more Siebel base tables, whereas, the "merge" task refers to the task of combining data from different records in one or more Siebel base tables into a single record. Further, the "delete" task refers to the task of deleting data in one or more Siebel base tables. Also, as used herein, the term "first script" refers to the "cm_xxxx_run_eim.ksh" script that is created, preferably, using a commercially available scripting language or tool, such as, the open source Korn Shell (ksh) programming language, whereas, the term "second script" refers to the "run_eim.ksh" script, which also is created, preferably, using a commercially available scripting language or tool, such as, the open source Korn Shell (ksh) programming language. The term "substantially simultaneously" or "substantially contemporaneously" means that as soon as one task is started, there is a delay of a minute or even seconds before the second task is started. Moreover, the starting of a task is single threaded, however, once the tasks have started they run simultaneously. For instance, task 1 is started, then task 2 is started, but after tasks 1 and 2 have started, the two tasks both run independently of one another. Further, the term "simultaneous EIM parameter" refers to the number of tasks to be run substantially simultaneously. Additionally, the term "batch" or "batch size" refers to the number of records to be processed using the EIM application, whereas, the term "batch range size" refers to the number of batches to process in a task. Further, as used herein "DB2®" refers to the DB2® relational database management software that is commercially available from International Business Machines (IBM) Corporation.

A precursor step in the process of updating data in a database, such as, a Siebel database is populating an intermediary table (EIM table) that is provided on the Siebel database. Any kind of utility or process, such as, SQL ancillary program utility or native SQL can be used to import external data into an EIM table and to export the data from the EIM table. Further, in order to prepare and/or load the EIM tables in the Siebel database, first, you need to identify the data that is going to be processed by the EIM application. Once the data has been loaded into the EIM tables, the data is processed using the EIM application to load data into one or more Siebel base tables. Preferably, the one or more tasks (plurality of tasks) are submitted from a server administration screen or from a server manager command line interface of a Siebel® server. Alternatively, the EIM process for updating data can be run in other ways, for instance, by issuing the server command embedded in the run_eim.ksh script or from a GUI (Graphic User Interface). Moreover, preferably, the tasks are of one type, namely, either all import tasks, all export tasks, all delete tasks, all merge tasks or all update tasks.

Still yet, any of the components of the present invention could be deployed, managed, serviced, etc. by a service provider who offers to update data in a database. Accordingly, in another embodiment, the invention provides a method of providing a service for manipulating data in a database, the method comprises providing a first script configured to manage queuing a plurality of tasks to be processed substantially simultaneously, and providing a second script configured to submit the plurality of tasks substantially simultaneously for manipulating the data in the database. The method further comprises configuring one or more parameters in the first script configured to manage queuing the plurality of tasks to be processed substantially simultaneously, and running the first script, which invokes the second script, such that a next task of the plurality of tasks is automatically submitted when one task of the plurality of tasks has been processed, until each task of the plurality of tasks is processed. Preferably, the one or more parameters in the first script comprises at least one of name of intermediary table in the database, driver file, batch range file, working directory file and configuration file.

More preferably, the first script automates a collection of statistics associated with and subsequent to completing a first batch of the plurality of tasks running to completion, such that the statistics collected optimize performance of any remaining batches of the plurality of tasks running to completion. Further, preferably, the second script monitors a total number of tasks running on the server and submits the next task of the plurality of tasks when a total number of tasks running on the server is less than a maximum number of tasks that the server can run. Further, the method comprises generating a collective log file summarizing an outcome for each task of the plurality of tasks subsequent to completion of all tasks of the plurality of tasks. In a preferred embodiment, the generating step comprises creating an individual log file corresponding to the each task of the plurality of tasks subsequent to completion of the all tasks of the plurality of tasks, and identifying in the collective log file a summary for each of the individual log files created for the each task of the plurality of tasks subsequent to completion of the all tasks of the plurality of tasks. Preferably, the database is a Siebel database, and preferably, each of the first script and the second script is a korn shell script. Further, preferably, the plurality of tasks comprises at least one of import, export, delete, merge and update.

In a preferred embodiment, the invention provides two new codes or scripts for automating the process of submitting multiple tasks to the EIM application for processing. Both codes are templates and each code can be customized on a case by case basis for running multiple tasks simultaneously. In particular, the two scripts are called the cm_xxxx_run_eim.ksh script (also referred to as the first script) and the run_eim.ksh script (also referred to as the second script). The cm_xxxx_run_eim.ksh script is run first, and the cm_xxxx_run_eim.ksh script calls or invokes the run_eim.ksh script, which is a custom script wrapped around a standard server command. The cm_xxxx_run_eim.ksh script sets up the process of submitting multiple tasks, whereas, the run_eim.ksh script actually submits one task at a time, but substantially simultaneously to the EIM application for processing the tasks (without having to manually assemble tasks) for updating data in one or more base tables in the Siebel database. In essence, the cm_xxxx_run_eim.ksh script manages the setting up of the multiplicity of tasks to be processed, and ensures that the processing is continuously maintained until all the tasks have been submitted for processing, whereas, the run_eim.ksh script starts or submits a server task to the EIM application for processing, while monitoring that the number of tasks to be processed simultaneously is not more than a maximum number of tasks that the server can run. Preferably, the EIM application is run via a server command, namely, the srvrmgr command—a Siebel command that invokes or starts the running of the EIM process. Accordingly, the invention provides a method for updating data in a database by running the EIM process automatically and, in particular, running multiple tasks substantially simultaneously. Further, the method includes monitoring the progress of the tasks. This invention automates the submission of and monitoring of the one or more tasks being sent to the EIM process. All that has to be specified is the maximum number of jobs or server tasks that one wants to run simultaneously and the codes take care of the rest without having to know how many batches there are to be processed by the EIM application.

Before running the cm_xxxx_run_eim.ksh script, one would first have to modify or specify certain parameters in an existing driver file. Alternatively, the driver file is not necessary if the cm_xxxx_run_eim.ksh script is changed to hard code all of the information that is retrieved from the driver file. The parameters to be modified or set forth in the driver file are the CM number, the simultaneous EIM parameter, the batch size parameter, and the batch range size parameter. Additionally, the other parameters that need to be set forth are the EIM User Id and the password. The CM number (or change management number), xxxx, (a numeric value) is analogous to a reference number that is used to manage the data corresponding to that CM number that has been worked on without affecting any other data, for instance, when a table is cleared, only the data that has a particular CM number is cleared versus other data in the database. So each time a server task is run, a different CM number is assigned, for example, any number from 1-9999. Further, the simultaneous EIM parameter is the number of tasks to be submitted at the same time, that is, substantially simultaneously or substantially contemporaneously. The CM number and the number of jobs to be run simultaneously are provided in the driver file. The number of records in a batch (batch size), and the number of batches in a range (batch range size) are also specified in the driver file, but are used by whatever external process that loads data in the EIM table and are not used by the first and second scripts. In a preferred embodiment, the batch parameter is provided in the range file, which specifies a set of ranges to be processed when a task is submitted. Further, preferably, the parameters in the EIM configuration file (.ifb file) are modified. The .ifb file is the standard file required by the EIM application, which basically tells the EIM application how the data is to be processed. For instance, one may want to ignore certain tables or columns or only populate certain tables or columns and these directives are specified in the configuration file. There are many more parameters that can be modified, as necessary, and this can be looked up in the EIM Administration guide from Siebel.

Figure 1A:
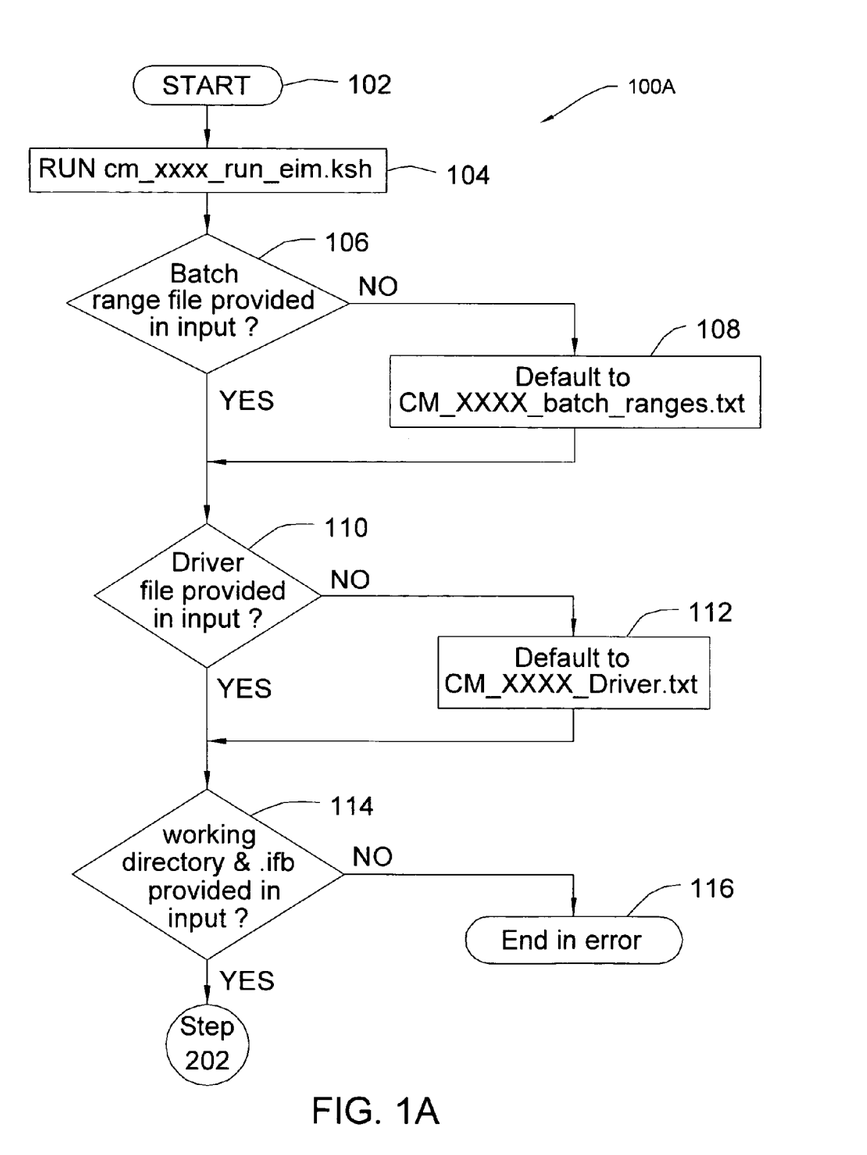
FIGS. 1A-1H are illustrations of a flowchart depicting a method of automating the submission of multiple server tasks for updating data in a database, in accordance with an embodiment of the invention.

Reference is now made to FIGS. 1A through 1H, which together depict a method of automating the submission of multiple server tasks for updating data in a database. As shown in 100A of FIG. 1A, the method of updating data in a database begins in step 102 with running the script called cm_xxxx_run_eim.ksh in step 104. In a preferred embodiment, a developer would have to change information contained in a few lines of the cm_xxxx_run_eim.ksh script, namely, the lines that provide the batch range file name, the driver file name, the CM number and the EIM table name which will be used to process the data, so that the cm_xxxx_run_eim.ksh script can get these values from the driver file. In addition, the user would need to assign values to or replace the values for the common directory and the script directory. Turning to FIG. 1A, the process 100A starts at 102 when the cm_xxxx_run_eim.ksh code is run in step 104, it first determines whether or not a batch range file is provided as an input parameter in step 106. If not, it defaults to the cm_xxxx_batch_ranges.txt file (step 108), which is read to extract the batch size and the batch range size parameters. The batch size is the number of records in each batch, whereas, the batch range size is the number of batches to be processed in a single task. Thus, a task is defined as a range of batches, where one batch is not necessarily equal to one task. Moreover, in a preferred embodiment, the batch range file is a text file that contains a beginning and an ending batch number for batches to be processed in a range. Each line in the batch range file is equal to one task that needs to be processed. Next, the script determines in step 110 whether or not the driver file is provided as an input parameter. If not, it defaults in step 112 to the cm_xxxx_Driver.txt file, which is read to retrieve the CM number and the simultaneous EIM parameter, that is, the number of server tasks to be run substantially simultaneously. The CM number is used for reporting and, preferably, also for building the log name of the log file that is generated. In step 114, the cm_xxxx_run_eim.ksh script checks to see if the working directory and the .ifb file (the configuration file) have been provided in the input. If these have not been provided in the input, the step ends in an error message, as shown in step 116. Preferably, the working directory is where the cm_xxxx_run_eim.ksh script is installed and run and, preferably, also where each of the batch range file, the driver file and the .ifb file is placed. The .ifb file is the configuration file and this file tells the EIM application what tasks (export, import, delete, merge and update) are to be performed by the EIM process. The configuration file (.ifb file) is required by the EIM process and the EIM process will not run without the configuration file. A developer preferably builds the configuration file to correspond to a specific task to be performed by the EIM process. Accordingly, values corresponding to the working directory name, the batch range file name, the driver file name and the configuration file name (.ifb file name), preferably, are passed to the cm_xxxx_run_eim.ksh shell on the command line. If the batch range file name or the driver file name are not passed as arguments in steps 106 and 110, respectively, default values are assigned in steps 108 and 112, respectively. If the working directory or the configuration file name are not passed as parameters in step 114, the process exits in error in step 116. However, if in step 114 the working directory and the .ifb file (configuration file) are provided in the input, the script proceeds to step 202 in FIG. 1B.

Figure 1B:
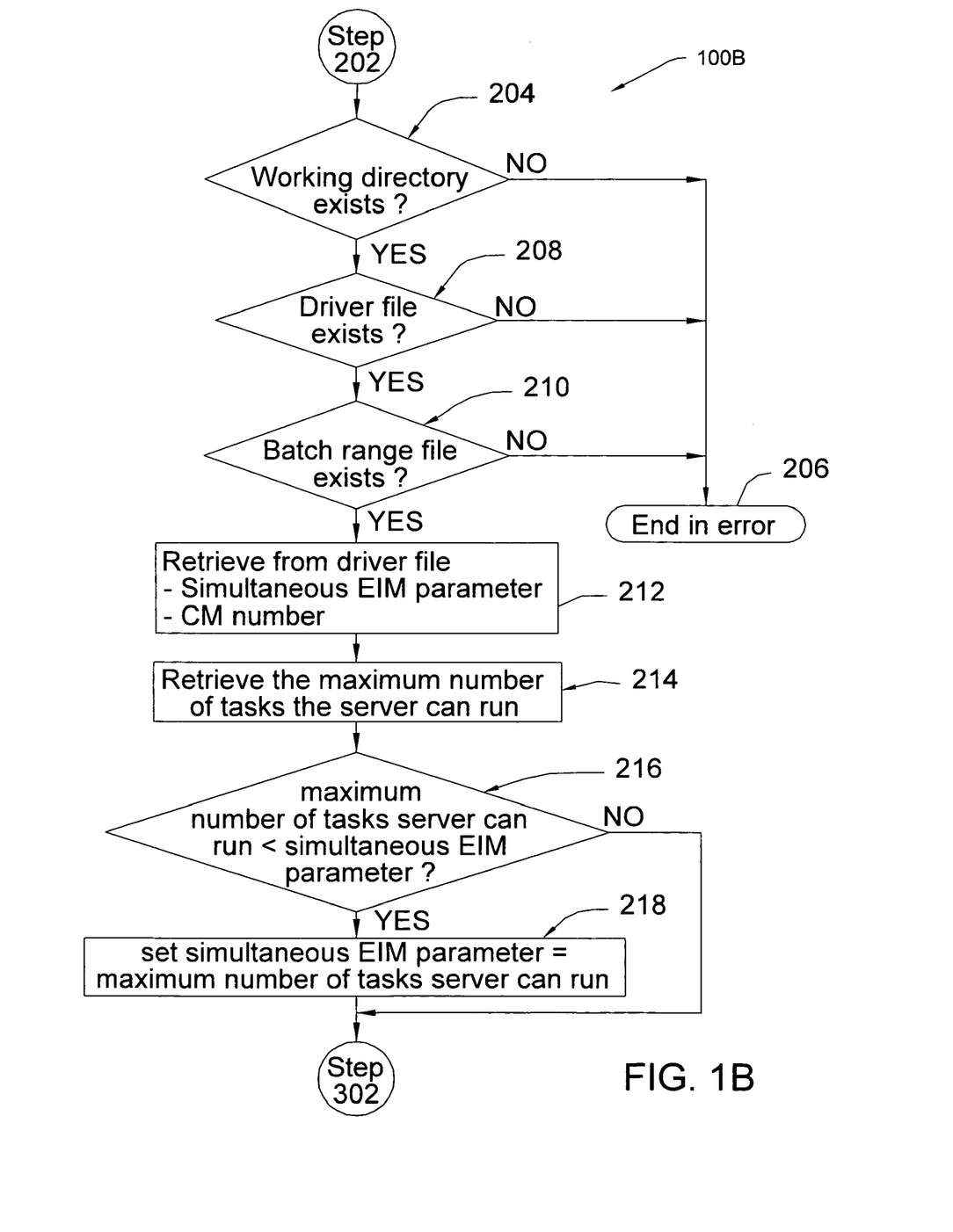

As shown in 100B of FIG. 1B, the process shown in FIG. 1A continues in FIG. 1B where the script tests to see if the working directory exists in step 204 and, if not, this step ends in an error message in step 206. If the working directory exists in step 204, then the script tests to see if the driver file exists in step 208 and, if not, this step ends in an error message in step 206. If the driver file exists in step 208, then the script tests to see if the batch range file exists in step 210, and if the batch range file does not exist, this step ends in an error message in step 206. Accordingly, the cm_xxxx_run_eim.ksh script preferably checks for the existence of the working directory name in step 204, the driver file name in step 208, and the batch range file name in step 210, and exits in error if any of these do not exist. However, the cm_xxxx_run_eim.ksh script does not test to see if the configuration file exists, since the cm_xxxx_run_eim.ksh script does not read any values from the configuration file. Turning to step 210, if the batch range file exists, the script next retrieves the simultaneous EIM parameter and the CM number form the driver file in step 212. The script also retrieves the maximum number of server tasks that the server can run in step 214. The script checks in step 216 whether the maximum number of server tasks that the server can run is less than the simultaneous EIM parameter, and if so, the simultaneous EIM parameter is set to the maximum number of server tasks that the server can run in step 218 and the script proceeds on to step 302. If the maximum number of server tasks retrieved is three and the simultaneous EIM parameter is set to more than three, then the script will re-set the simultaneous EIM parameter to three, that is, the maximum number of server tasks that the server can run, so that the simultaneous EIM parameter is not greater than the number of tasks that the server can run. If the maximum number of server tasks that the server can run is not less than, that is, greater than the simultaneous EIM parameter in step 216, the script proceeds to step 302 in FIG. 1C.

Figure 1C:
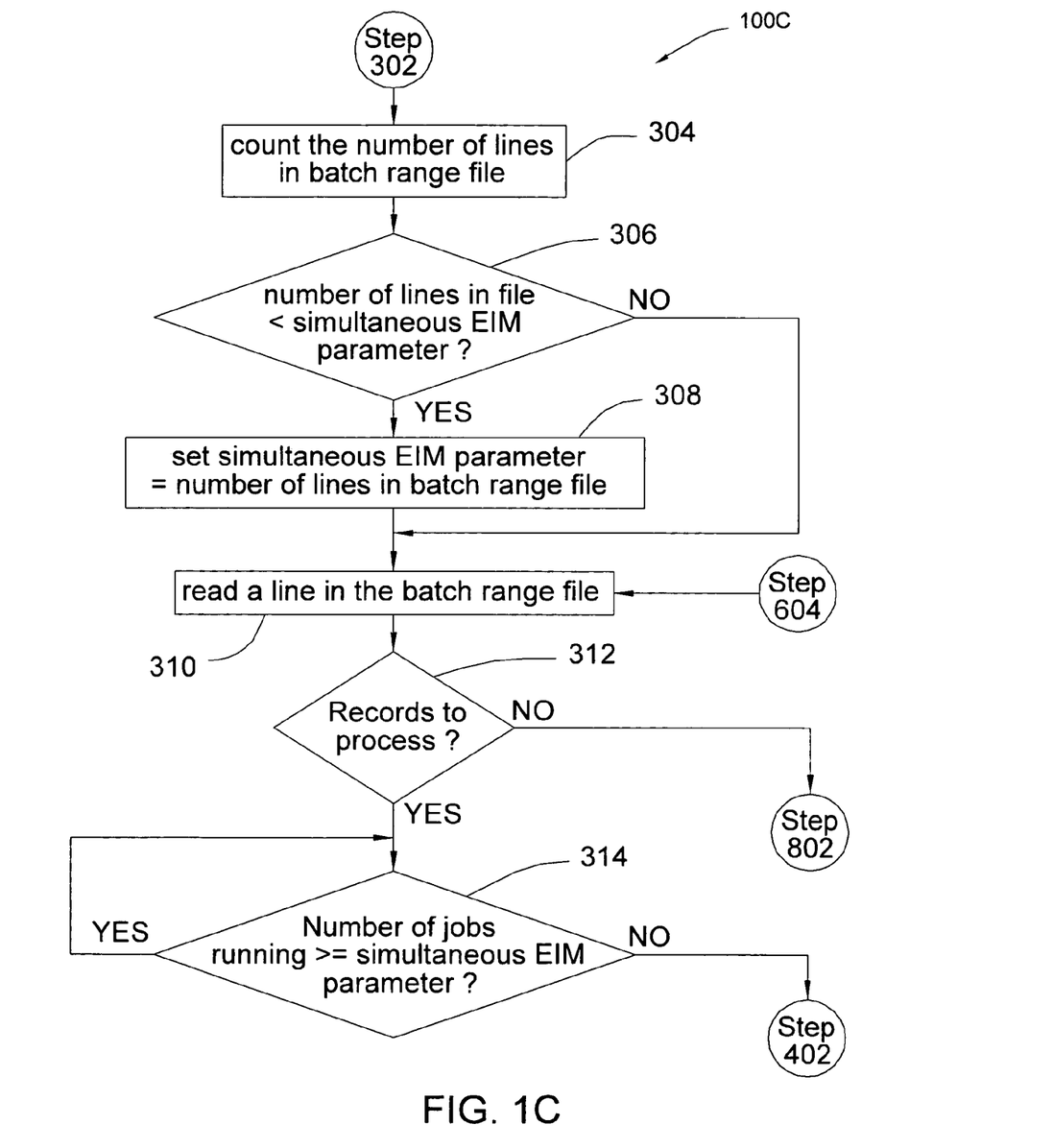

The process continues as shown in 100C of FIG. 1C, where the script counts the number of lines in the batch range file in step 304 and determines in step 306 if the number of lines in the batch range file is less than the simultaneous EIM parameter. If the number of lines in the batch range file is less than the simultaneous EIM parameter, then the simultaneous EIM parameter is set to the number of lines in the batch range file in step 308 and the script proceeds to step 310 to read a line in the batch range file. Also, if the number of lines in the batch range file is greater than or equal to the simultaneous EIM parameter in step 306, the script proceeds to read a line in the batch range file in step 310. Further, step 604 in FIG. 1F loops back to step 310, as will be explained herein below with respect to FIG. 1F. After the script reads the first line in the batch range file in step 310, it determines whether or not there are records to process in step 312. If there are no more records to process in step 312, then the cm_xxxx_run_eim.ksh script proceeds to step 802 in FIG. 1H, as explained herein below with respect to FIG. 1H. If there are records to process in step 312, it determines in step 314 whether or not the number of jobs running on the server is greater than or equal to the simultaneous EIM parameter. If there are more or as many jobs running than the simultaneous EIM parameter allows, the cm_xxxx_run_eim.ksh script waits for a predetermined interval and rechecks in step 314 whether the number of jobs running is greater than or equal to the simultaneous EIM parameter and if the number of jobs running is less than the simultaneous EIM parameter, the cm_xxxx_run_eim.ksh script proceeds to step 402 in FIG. 1D.

Figure 1D:
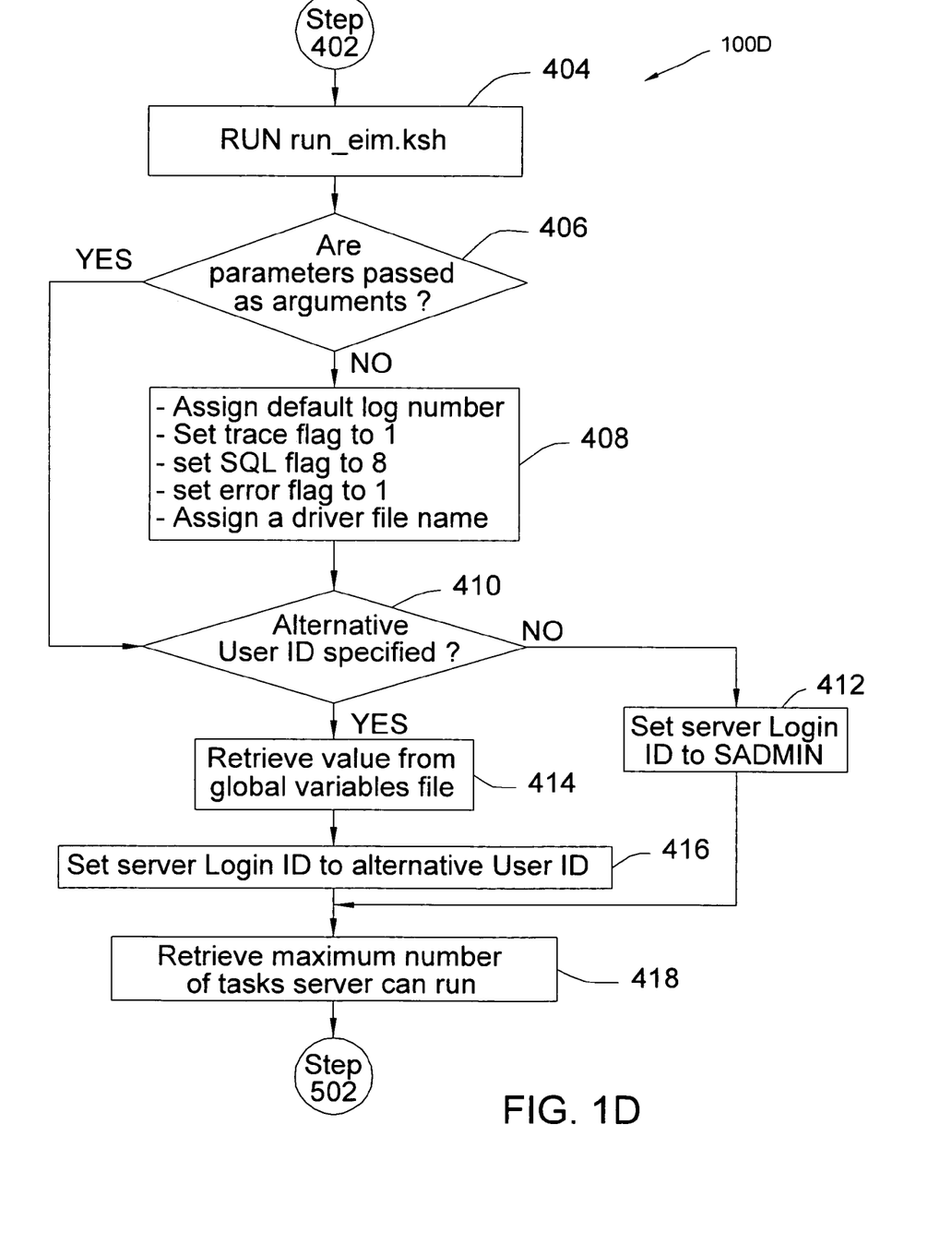

In particular, as shown back in FIG. 1C, if the number of jobs running is less than the simultaneous EIM parameter in step 314, then the cm_xxxx_run_eim.ksh script calls or invokes the run_eim.ksh script in step 404 in FIG. 1D. As shown in 100D of FIG. 1D, when the run_eim.ksh script is run, it checks to see if certain parameters have been passed as arguments in step 406. In a preferred embodiment, the parameters, such as, the log number, trace flag, SQL flag, error flag, driver file name can be passed as arguments to the cm_xxxx_run_eim.ksh shell on the command line. However, if the log number, trace flag, SQL flag, error flag, driver file name are not passed as arguments in step 406, in a preferred embodiment, the script assigns in step 408 a default log number and a driver file name, the trace flag is set to 1, the SQL flag is set to 8, and the error flag is set to 1. In particular, the trace flag sets the level of trace produced in the EIM log, that is, they determine the level of detail produced in the log for each element. Similarly, the SQL flag sets the level of SQL produced in the EIM log and the error flag sets the level of error messages produced in the EIM log. In particular, the Trace flag would be the amount of detail concerning each processing step, the SQL flag the amount of SQL that is reproduced in the log and the error flag the level of detail provided when a record errors out. Available values for the trace flag parameter include 1, 2, 4, 8, and 32. As such, default values for these parameters can vary per Siebel instance. In particular, as shown in step 408, setting the error flag parameter to 1 produces a detailed explanation of rows that were not successfully processed. Further, setting the SQL flag parameter to 8 creates a log of all SQL statements that make up the server task, whereas, setting lower values (such as, 1, 2, and 4) for the SQL flag creates a log at the database level. Similarly, setting the trace flag parameter to 1 creates a step-oriented log of the task, which can be used to determine the amount of time EIM spends on each step of the server task, or for each EIM table processed. Also, "Assign default log number" means that the log will be overwritten each time the run_eim.ksh script is called if a different log number is not passed. If the run_eim.ksh script determines in step 406 that these parameters have been passed as arguments in the cm_xxxx_run_eim.ksh script, the run_eim.ksh script next checks to see whether an alternative User Id (Identity) is specified in step 410. If an alternative User Id is specified in step 410, the run_eim.ksh script retrieves the alternative User Id value from the global variables file in step 414. Further, in step 416 the server Login Id is set to the alternative User Id that is retrieved from the global variables file. The global variables file (also know as the Siebel.variables file) is a separate file preferably located in the 'common' directory. In a preferred embodiment, the execution of the run_eim.ksh script starts with the execution of the Siebel.variables file to export common variables to the process, such as, User Id and Pass (password) as well as other parameters used to start the server manager, such as, the gateway server parameter, the enterprise server parameter and the application server. Preferably, the User Id and Pass are provided in the driver file. However, if the User Id and Pass are not provided in the driver file, then the run_eim.ksh script defaults to the standard User Id specified in step 412. Preferably, if the alternative User Id is not specified in step 410, the server Login Id is set to SADMIN in step 412. Next, in step 418, the run_eim.ksh script retrieves the maximum number of server tasks that the server can run and proceeds to step 502 shown in FIG. 1E.

Figure 1E:
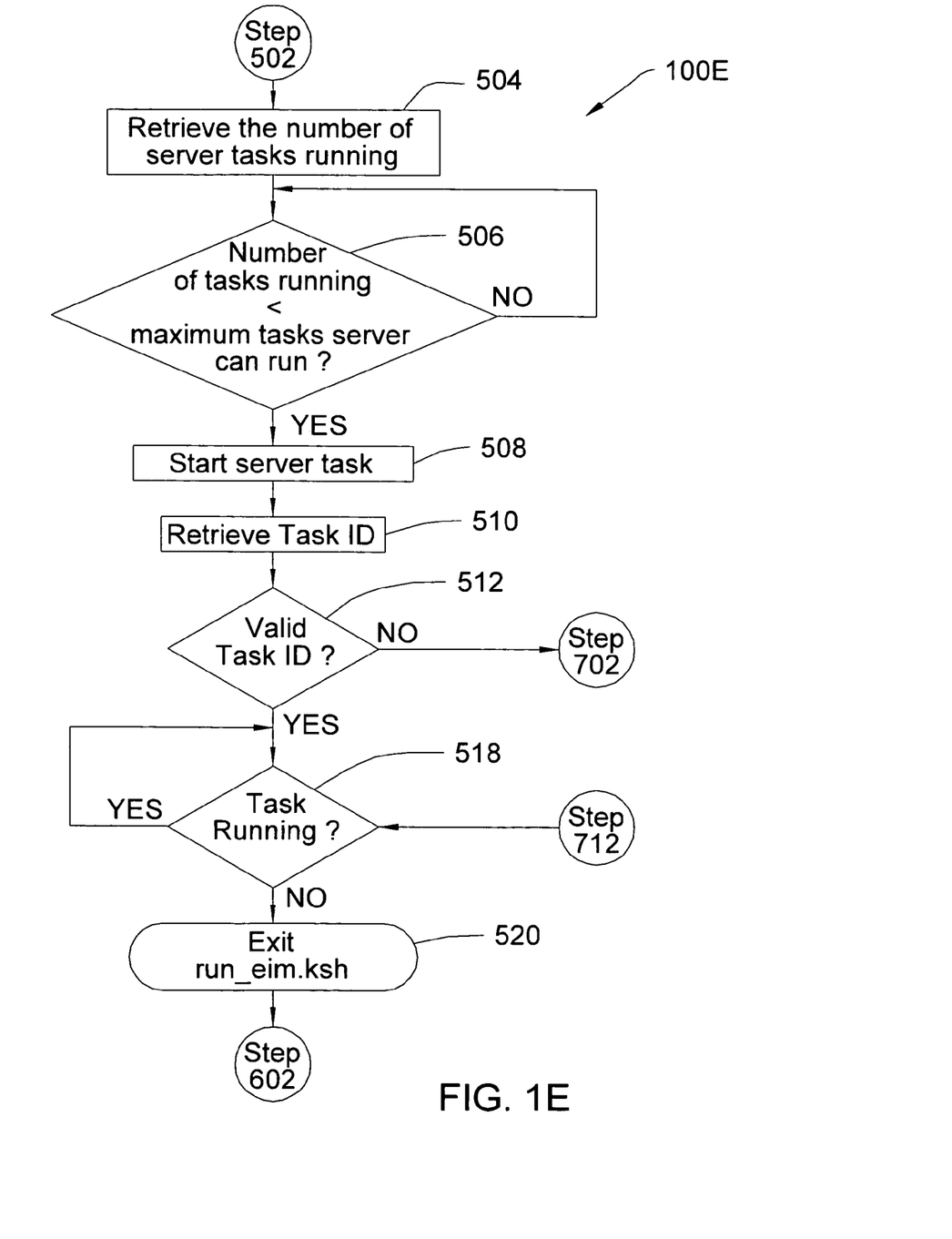

Turning to 100E of FIG. 1E, the run_eim.ksh script retrieves the number of server tasks running on the server in step 504. The maximum number of tasks that the server can run is a server setting. Preferably, the run_eim.ksh script starts or executes the server manager component (program) of the Siebel EIM application to retrieve the maximum number of server tasks that can be run on the server at any one time. The script determines in step 506 if the number of tasks running is less than the maximum number of server tasks that the server can run. If the number of tasks running is less than the maximum number of server tasks that the server can run, the server task is started in step 508. If in step 506 the number of tasks running is equal to or greater than the maximum number of server tasks that the server can run, then step 506 is repeated after a predetermined interval has expired, such that the number of tasks running is less than the maximum number of server tasks that the server can run. When the number of tasks running is less than the maximum number of server tasks that the server can run, the script submits or starts a server task in 508. Then, the run_eim.ksh script retrieves the Task Id in step 510 and a determination is made in step 512 as to whether or not the Task Id is valid. The Task Id is a number that the Siebel server (running the EIM application) attributes to each job that is submitted. It is used to create the log file for each task that is completed. If the Task Id is not a valid Task Id in step 512, then the script checks in step 702 in FIG. 1G to see if it is a known error, as explained herein below with respect to FIG. 1G. If it is a valid Task Id in step 512 and/or after retrieving the Task Id when it is a known error in step 712, then a determination is made in step 518 as to whether or not a job/task is running in step 518. Step 712 will be explained herein below with respect to FIG. 1G. Turning to step 518 in FIG. 1E, if a job is running, the run_eim.ksh script loops back to make sure that the EIM job or task that is running is completed before exiting in step 520. If there is no job or task running in step 518, the run_eim.ksh script exits in 520 and the cm_xxxx_run_eim.ksh script continues the process in 100F of FIG. 1F with step 602.

Figure 1F:
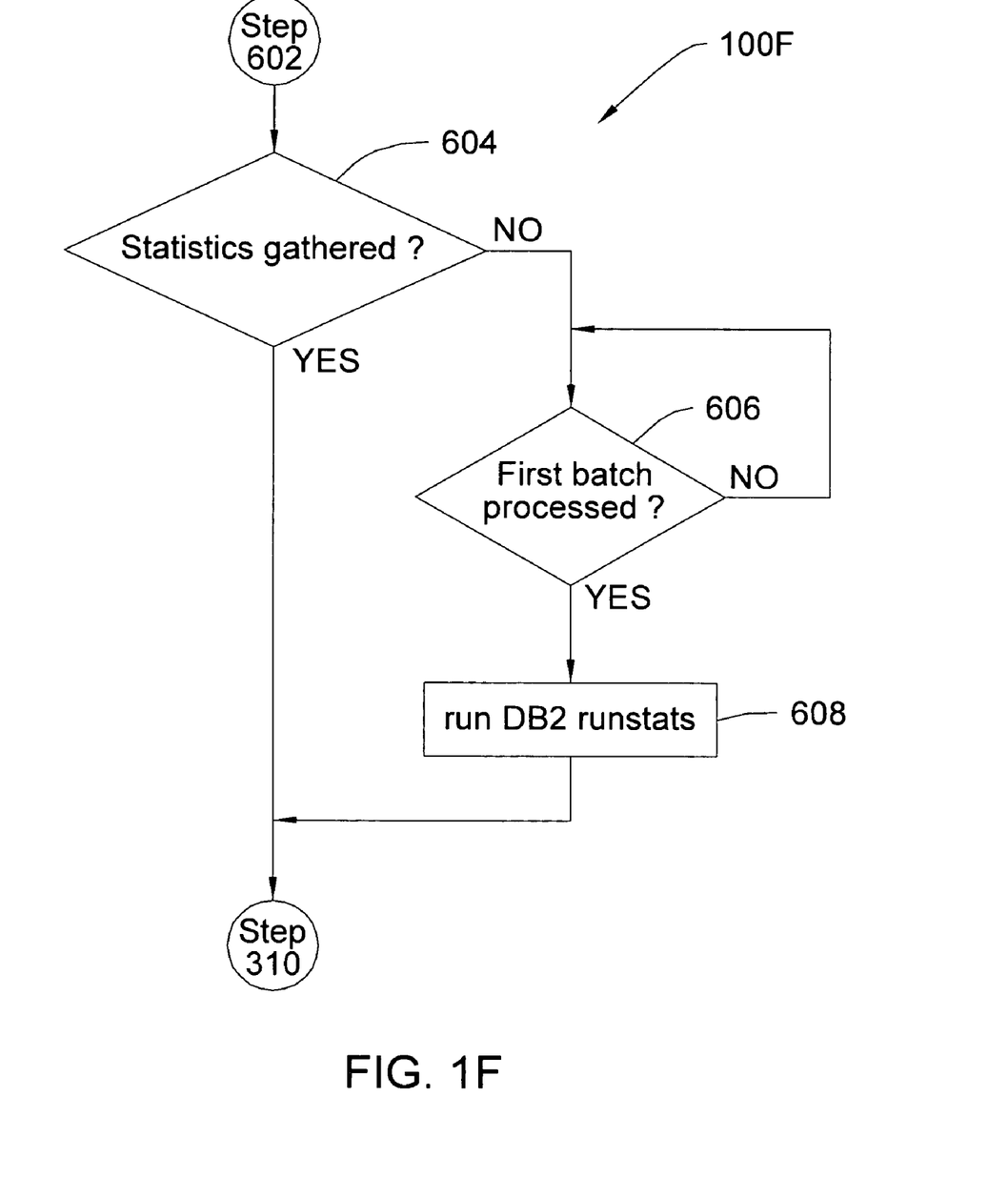

As shown in step 604 of 100F of FIG. 1F, the cm_xxxx_run_eim.ksh script checks to see whether or not statistics are gathered in step 604. In a preferred embodiment, the cm_xxxx_run_eim.ksh script monitors whether the first batch has been processed in step 606 and, if so, it runs in step 608 the DB2® Runstats utility, which gathers statistics to enhance performance of the next line that is read in the batch range file, namely, in step 310 of FIG. 1C. In a preferred embodiment, the DB2® Runstats utility recalculates index usage and paging to allow the DB2® Optimizer to choose the best path to access data in the interface table. When the first batch has been processed indexes will be updated with new data, enabling statistics to be gathered, thus, the DB2® Runstats utility is not performed until after the first batch has been processed. The DB2® Runstats utility is run preferably after the first batch is completed and not after each batch, that is, statistics are only gathered once. In a preferred embodiment, the DB2® Runstats utility is coded in the cm_xxxx_run_eim.ksh script, however, it can be coded to run as a separate component. Preferably, the cm_xxxx_run_eim.ksh script monitors for completion of the first batch and automatically runs the DB2® Runstats utility. This allows for considerable improvement in performance and avoids the need to have someone monitor the job to determine if and when the DB2® Runstats utility is needed. In a preferred embodiment, the collecting of statistics associated with the first batch allows, for instance, the DB2® Optimizer to determine what is the optimal path to take when running queries, which in turn optimizes the performance of the remaining batches of the plurality of tasks utilizing the one or more optimized database queries, since after DB2® Runstats utility has been run, the script reads the next line in the batch range file in step 310 in FIG. 1C. The process outlined above continues (as per the arrow from step 604 in FIG. 1E to step 310 in FIG. 1C) until all lines have been read in the batch range file. Thus, the collecting of statistics optimizes the performance of any remaining batches in the first task as well as all the other tasks that are run from that point on.

Figure 1G:
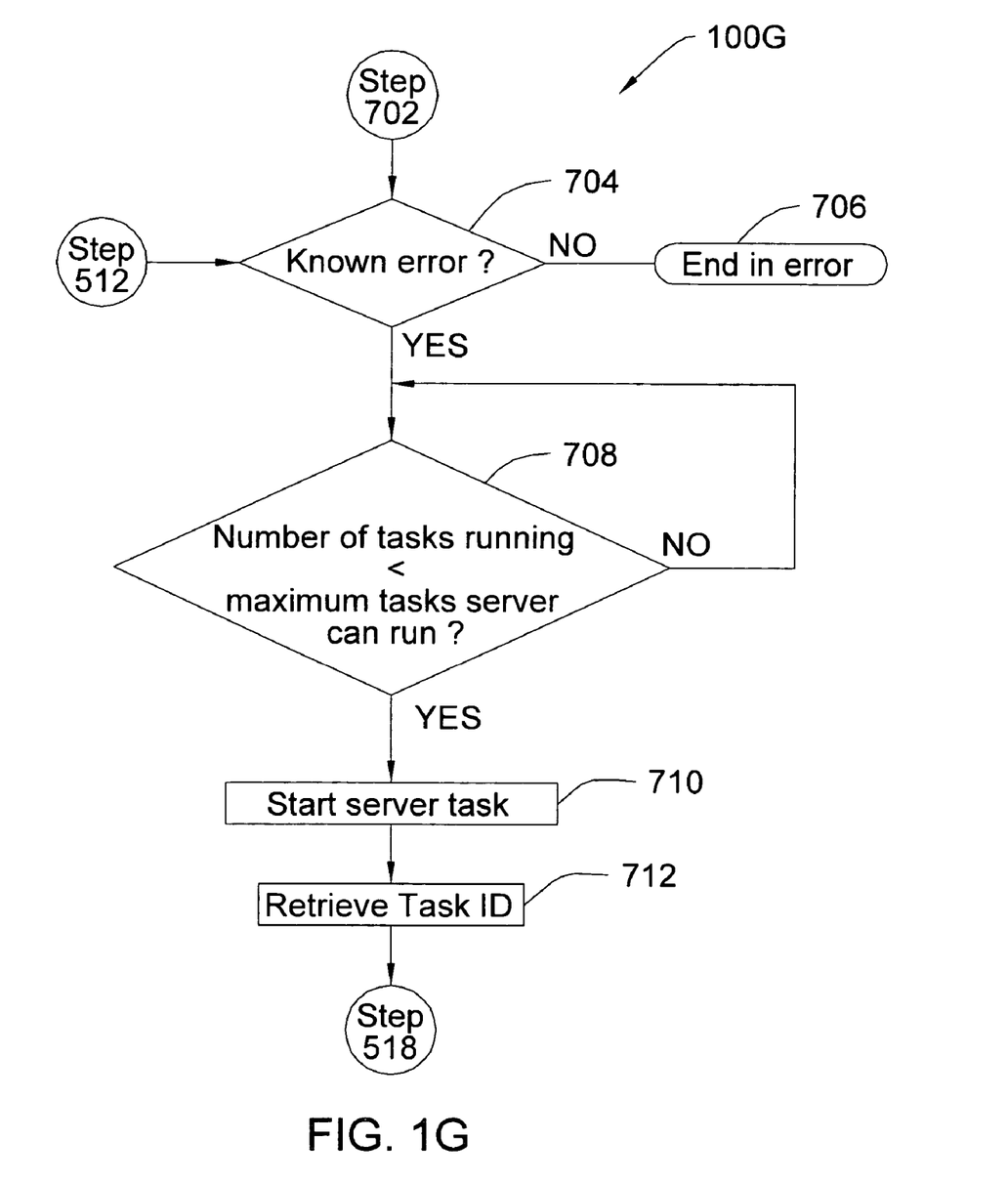

Referring back to FIG. 1E, if it is determined in step 512 that the Task Id is not valid, then the run_eim.ksh script proceeds to step 702 in FIG. 1G. As shown in 100G of FIG. 1G, the run_eim.ksh script determines whether the error is known in step 704. If the error is not known in step 704, the process ends in an error message in step 706. If the error is known, the script determines in step 708 whether the number of tasks running is less than the maximum number of server tasks that can be run on the server. If the number of tasks running is greater than or equal to the maximum number of server tasks that can be run on the server, then the run_eim.ksh script preferably waits for a predetermined interval and rechecks in step 708 whether the number of tasks running is less than the maximum number of server tasks that can be run on the server, before proceeding any further. If in step 708 the number of tasks running is less than the maximum number of server tasks that can be run on the server, then the run_eim.ksh script starts or submits a server task in step 710. The run_eim.ksh script retrieves the Task Id in 712 and the process goes back to step 518 in FIG. 1E to check whether any jobs are still running and, if not, exiting in step 520. If a job is running in step 518 in FIG. 1E, then the run_eim.ksh script waits to perform a check as to whether a job is still running before exiting in step 520.

Figure 1H:
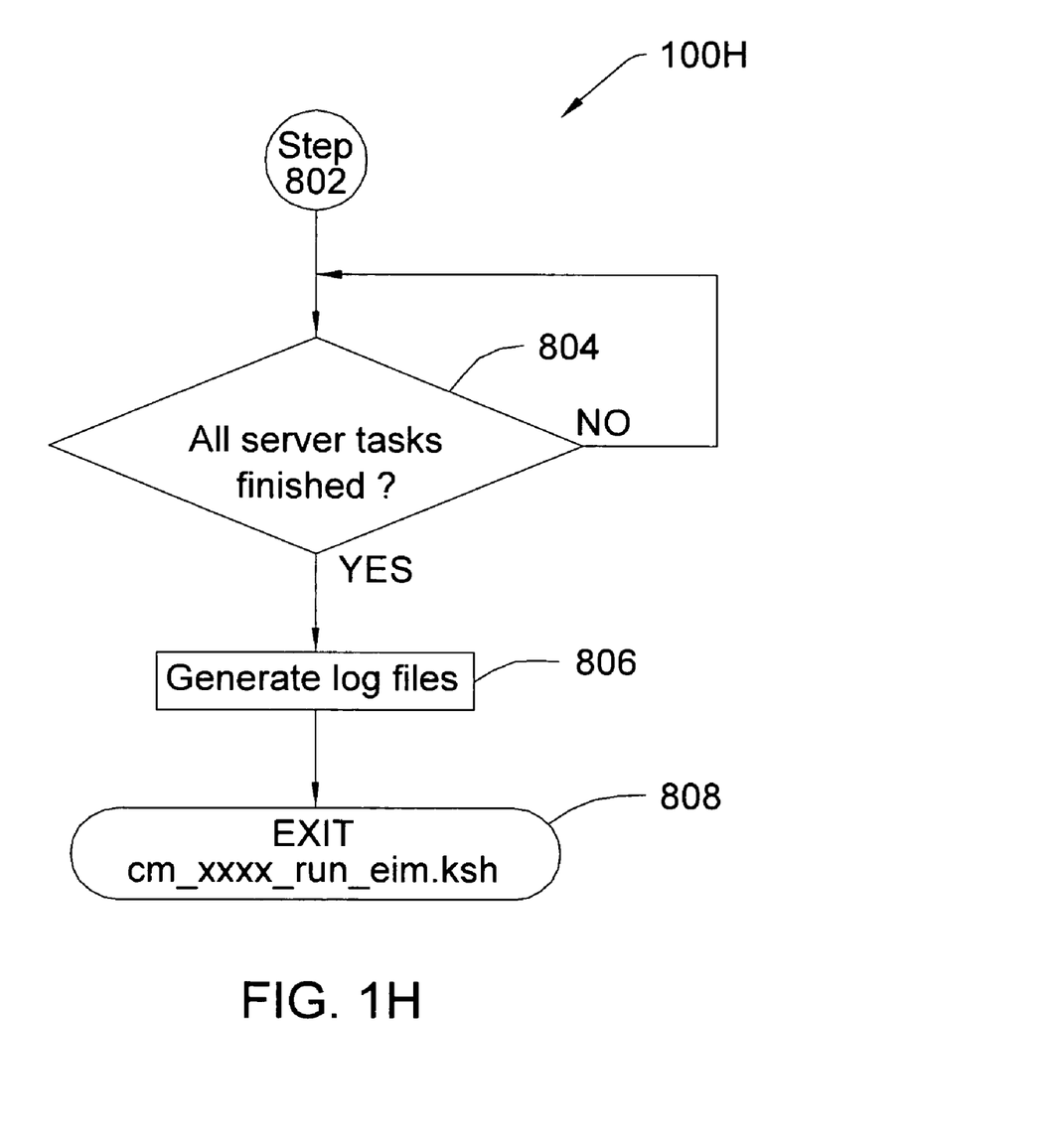

Further, referring back to step 312 in FIG. 1C, if there are no more records to process in step 312, the process moves on to step 802 in FIG. 1H. As shown in 100H of FIG. 1H, the cm_xxxx_run_eim.ksh script determines whether all run_eim.ksh tasks have been finished processing in step 804. If all run_eim.ksh tasks are not finished, then the cm_xxxx_run_eim.ksh waits for a predetermined interval before rechecking in step 804 to determine whether all server tasks have been finished processing. If all server tasks have been finished processing in step 804, then the cm_xxxx_run_eim.ksh script generates log files in step 806, before exiting in step 808.

Preferably, a user or developer needs to know the total number of records that need to be processed in order to set the batch size and batch range parameters. This is required in order to populate the batch range file correctly since the batch range file sets forth what batches are to be processed. One skilled in the art would need to load this data in order to provide the correct batch and the correct batch size. As mentioned earlier, in order to customize the cm_xxxx_run_eim.ksh script, preferably, a developer or user would need to change information contained in only a few lines of the cm_xxxx_run_eim.ksh script. Preferably, a developer would have to specify the batch range file name, the name of the driver file, change the cm_xxxx values to the value of the CM (Change Management) records to be run (that is, the CM number) and set the eim_xxxxxx value to the interface table from which data is to be processed using the EIM process. Further, the name of the cm_xxxx_run_eim.ksh script would have to be changed to specify the xxxx number to be used. As explained herein above, the cm_xxxx_run_eim.ksh script invokes a server manager command (namely, the srvrmgr command on the command line) to determine the maximum tasks that the server can run for the EIM process. Further, the cm_xxxx_run_eim.ksh script also invokes the run_eim.ksh script. Moreover, the run_eim.ksh script invokes several server manager commands to obtain or execute the following: retrieving the maximum number of tasks setting from the EIM enterprise server; executing a function that submits a server manager command to count the number of running EIM jobs or server tasks and, if the number of server tasks running is greater than or equal to the maximum number of server tasks that can be run, the script will wait until a slot is available before allowing another server task to be submitted; starting a server manager task that submits a server task using the .ifb file (configuration file) and batch range file; and submitting, after all tasks have been submitted, a server manager task that waits until all submitted tasks have ended before exiting the process.

For example, if a user sets forth a batch size (number of records) to 300 records, and sets forth a batch range size of 50, then batch 1 will contain 300 records, batch 2 will contain another 300, and batch 3 further contains another 300 records. Further, if the number of simultaneous EIM jobs is set to 2, this means that the server should process two server tasks substantially simultaneously, that is, a task would be submitted for batch 1-50, and a separate task is submitted for 51-100. When one task, for instance, task 1 for batch 1-50 ends another task for batch 51-100 is started, thus, maintaining two active tasks (as per the simultaneous EIM parameter of 2) until all five tasks have been processed in order to update data in a database. In particular, the lines in the batch range file would contain the following lines: 1-50 (first line); 51-100 (second line); 101-150 (third line); 151-250 (fourth line); and 251-300 (fifth line). Each line in the batch range file is equal to one task, so the line 1-50 is the first task, 51-100 is the second task, 101-150 is the third task, and so on and so forth, and the plurality of tasks to be processed is 5. Moreover, the number of records in a given task is equal to the number of records in a batch (batch size) multiplied by the number of batches in the range (range size), so in this case, the number of records to be processed in each task is: 300 (batch size)*50 (batch range size)=15000 records in a task. This means that the first 15000 records will be processed substantially simultaneously with the next 15000 records, since the simultaneous EIM parameter is set to 2. Moreover, the first script automates the collecting of statistics by running the DB2® Runstats utility after the first batch has been run, namely, after the first 300 records of the 15000 records in a task. This improves the performance of the remaining batches in the first task. Further, since the maximum number of server tasks that the server can run is a fixed number, if the simultaneous EIM parameter is set to a higher number than the maximum number of server tasks that the server can run, the run_eim.ksh script will set the simultaneous EIM parameter equal to the number of maximum number of server tasks that the server can run.

In yet another embodiment, the invention provides a computer program product for processing data in a database. The program product comprises a computer readable medium, first program instructions to initiate a plurality of tasks adapted to process data in the database, such that the plurality of tasks run substantially contemporaneously. Preferably, the first instructions comprise instructions to test whether one or more parameters for the plurality of tasks are passed as arguments and to check whether the one or more parameters exist before initiating the plurality of tasks to be run substantially contemporaneously. Further, the computer program product comprises second program instructions to automate a collection of statistics associated with and subsequent to completion of a first batch of the plurality of tasks running to completion, wherein the statistics collected optimize performance of any remaining batches of the plurality of tasks running to completion, and third program instructions to automatically submit a next task of the plurality of tasks when one task of the plurality of tasks has been processed, until each task of the plurality of tasks is completed for processing the data in the database. Preferably, the third instructions comprise instructions to queue the next task of the plurality of tasks when a number of tasks running is less than the plurality of tasks to be run substantially contemporaneously and to start the next task of the plurality of tasks only when a total number of tasks running on the server is less than a maximum number of tasks that can run on the server, until each of the plurality of tasks are run to completion. Furthermore, the computer program product comprises fourth program instructions to generate a log file summarizing an outcome for each task of the plurality of tasks subsequent to completion of all tasks of the plurality of tasks, wherein the fourth program instructions are stored on the medium. Preferably, each of the first, second, third and fourth program instructions is stored on the medium. Preferably, the database is a Siebel database and the plurality of tasks comprises at least one of: import, export, delete, merge and update.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc—read only memory (CD-ROM), compact disc—read/write (CD-R/W) and digital versatile/video disc (DVD).

Figure 2:
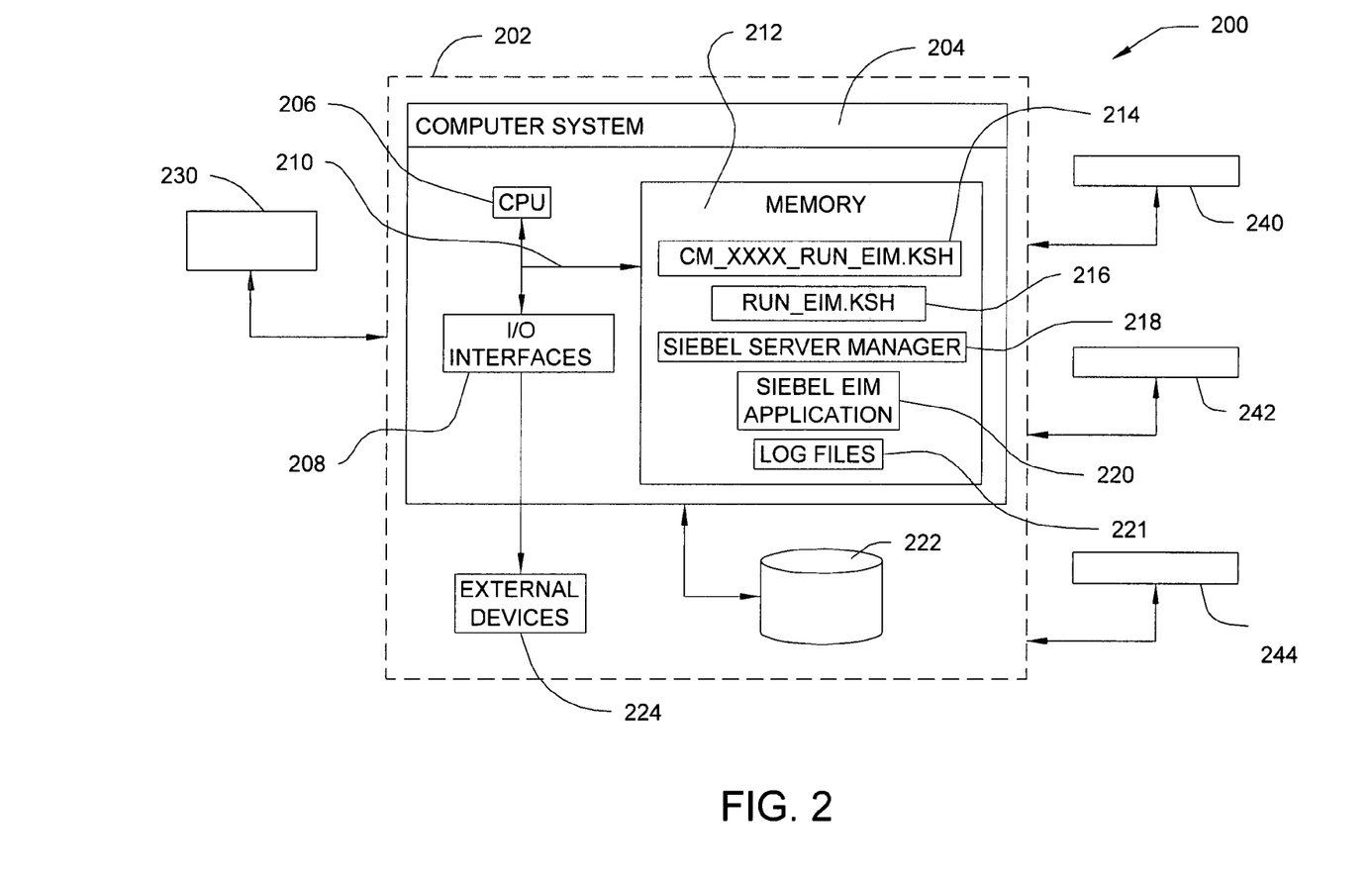
FIG. 2 is a schematic block system diagram illustrating a computer program product for automating the submission of multiple server tasks for updating data in a database, in accordance with an embodiment of the invention.

Referring now to FIG. 2, there is illustrated a system 200 for updating data in a database, according to the present invention. As depicted, system 200 includes a computer infrastructure 202, which is intended to represent any type of computer architecture that is maintained in a secure environment (i.e., for which access control is enforced). As shown, infrastructure 202 includes a computer system 204 that typically represents a server or the like. Preferably, the computer system 204 is a Siebel Enterprise Server. It should be understood, however, that although not shown, other hardware and software components (e.g., additional computer systems, routers, firewalls, etc.) could be included in infrastructure 202.

In general, a user or programmer 230 interfaces with infrastructure 202 to automatically submit multiple server tasks to be processed substantially simultaneously. Similarly, one or more other users or programmers (designated by numerals 240, 242 and 244) can interface with infrastructure 202 to automatically submit multiple server tasks to be processed substantially simultaneously. Alternatively, a service provider 230 that provides a service (preferably, a service that is provided on a fee or subscription basis) to clients, for instance, 240, 242 and 244, for updating data in a database can interface with infrastructure 202 to update data in a database. To this extent, infrastructure 202 provides a secure environment. In general, the parties could access infrastructure 202 directly, or over a network via interfaces (e.g., web browsers) loaded on computerized devices (e.g., personal computers, laptops, handheld devices, etc. not shown in FIG. 2). In the case of the latter, the network can be any type of network such as the Internet, a local area network (LAN), a wide area network (WAN), a virtual private network (VPN), etc. In any event, communication with infrastructure 202 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

Computer system 204 is shown to include a CPU (hereinafter "processing unit 206"), a memory 212, a bus 210, and input/output (I/O) interfaces 208. Further, computer system 204 is shown in communication with external devices (external I/O devices/resources) 224 and a storage system 222, where a database, preferably, a Siebel database is stored. In general, processing unit 206 executes computer program codes or scripts, such as the cm_xxxx_run_eim.ksh 214 and the run_eim.ksh scripts 216, which are stored preferably in memory 212 and, alternatively, can be stored in storage system 222. Similarly, processing unit 206 executes the Siebel Server Manger 218 and the Siebel EIM application 220. Further, in a preferred embodiment, the log files 221 created during the process of updating data are stored in memory 212. While executing computer program code, processing unit 206 can read and/or write data, to/from memory 212, storage system 222, and/or I/O interfaces 208. Bus 210 provides a communication link between each of the components in computer system 204. External devices 224 can comprise any devices (e.g., keyboard, pointing device, display, etc.) that enable a user to interact with computer system 204 and/or any devices (e.g., network card, modem, etc.) that enable computer system 204 to communicate with one or more other computing devices.

Computer infrastructure 202 is only illustrative of various types of computer infrastructures for implementing the invention. For example, in one embodiment, computer infrastructure 202 comprises two or more computing devices (e.g., a server cluster) that communicate over a network to perform the various process steps of the invention. Moreover, computer system 204 is only representative of various possible computer systems that can include numerous combinations of hardware. To this extent, in other embodiments, computer system 204 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 206 may comprise a single processing unit, or be distributed across one or more processing units in one or more locations, e.g., on a client and server. Similarly, memory 212 and/or storage system 222 can comprise any combination of various types of data storage and/or transmission media that reside at one or more physical locations. Further, I/O interfaces 208 can comprise any system for exchanging information with one or more external devices 224. Still further, it is understood that one or more additional components (e.g., system software, math co-processing unit, etc.) not shown in FIG. 2 can be included in computer system 204. However, if computer system 204 comprises a handheld device or the like, it is understood that one or more external devices 224 (e.g., a display) and/or storage system(s) 222 could be contained within computer system 204, not externally as shown. Storage system 222 can be any type of system (e.g., a database) capable of providing storage for information under the present invention. To this extent, storage system 222 could include one or more storage devices, such as a magnetic disk drive or an optical disk drive. In another embodiment, storage system 222 includes data distributed across, for example, a local area network (LAN), wide area network (WAN) or a storage area network (SAN) (not shown). Although not shown, additional components, such as cache memory, communication systems, system software, etc., may be incorporated into computer system 204.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for updating data in a database, said method comprising the steps of:

providing a database residing within a computer system consisting essentially of one server;

retrieving a predetermined maximum number of server tasks that can be run on said one server at a given time;

initiating a plurality of server tasks to update data in a base table in said database, wherein said plurality of server tasks run contemporaneously on said one server, wherein said plurality of server tasks initiated consists essentially of a single type of server task chosen from a server task group comprised of: import task, export task, delete task, merge task and update task;

specifying one or more parameters for said plurality of server tasks in a driver file, said one or more parameters including said predetermined maximum number of server tasks that can be run contemporaneously on said one server at said any given time;

testing whether said one or more parameters for said plurality of server tasks are passed as arguments; and checking whether said one or more parameters exist before initiating said plurality of server tasks on said one server;

automating a collection of statistics associated with and subsequent to completing a first batch of said plurality of server tasks running to completion on said one server, wherein said collection of statistics optimize performance of any remaining batches of said plurality of server tasks running to completion based on choosing an optimum path for accessing data from an intermediary table for updating said data in said base table; and automatically submitting a next server task of said plurality of server tasks when a server task of said plurality of server tasks has been processed on said one server, until each server task of said plurality of server tasks has been processed for updating said data in said database on said one server and up to said predetermined maximum number of server tasks that can be run contemporaneously on said one server at any given time.

2. The method according to claim 1, further comprising the step of:

generating a log file summarizing an outcome for said each server task of said plurality of server tasks subsequent to completion of all server tasks of said plurality of server tasks on said one server.

3. The method according to claim 1, wherein said initiating step comprises the steps of:

specifying one or more parameters for said plurality of server tasks in a driver file, said one or more parameters including said predetermined maximum number of server tasks that can be run contemporaneously on said one server at said any given time;

testing whether said one or more parameters for said plurality of server tasks are passed as arguments; and checking whether said one or more parameters exist before initiating said plurality of server tasks on said one server.

4. The method according to claim 1, wherein said initiating step comprises the step of:

running a first script that invokes a second script, such that said plurality of server tasks run contemporaneously until said each of said plurality of server tasks has run to completion for updating said data in said database on said one server.

5. The method according to claim 4, wherein said automatically submitting step comprises the steps of:

said first script managing queuing said next server task of said plurality of server tasks when a number of server tasks running is less than a number of server tasks to be run contemporaneously on said one server; and said second script submitting said next server task of said plurality of server tasks when a total number of server tasks running on said one server is less than said predetermined maximum number of server tasks that said one server can run, such that said each of said plurality of server tasks are run to completion on said one server.

6. A method of providing a service for manipulating data in a database, said method comprising the steps of:

providing a database residing within a computer system consisting essentially of one server;

retrieving a predetermined maximum number of server tasks that can be run on said one server at any given time;

providing a first script configured to manage queuing a plurality of server tasks to be processed simultaneously on said one server, and providing a second script configured to submit said plurality of server tasks simultaneously for manipulating said data in a base table of said database, wherein said plurality of server tasks submitted consists essentially of a single type of server task chosen from a server task group comprised of: import task, export task, delete task, merge task and update task, and wherein each of said first script and said second script comprises a korn shell script running on said one server;

configuring one or more parameters in said first script configured to manage queuing said plurality of server tasks to be processed simultaneously on said one server and up to said predetermined maximum number of server tasks that can be run on said one server at said any given time, said one or more parameters being specified in a driver file and including said predetermined maximum number of server tasks that can be run contemporaneously on said one server at said any given time;

testing whether said one or more parameters for said plurality of server tasks are passed as arguments;

checking whether said one or more parameters exist before initiating running of said plurality of server tasks on said one server;

running said first script, said first script invoking said second script, wherein a next server task of said plurality of server tasks is automatically submitted when one server task of said plurality of server tasks has been processed, until each server task of said plurality of server tasks is processed on said one server; and generating a collective log file summarizing an outcome for said each server task of said plurality of server tasks subsequent to completion of all server tasks of said plurality of server tasks run on said one server.

7. The method according to claim 6, wherein said first script automates a collection of statistics associated with and subsequent to completing a first batch of said plurality of server tasks running to completion on said one server, such that said statistics collected optimize performance of any remaining batches of said plurality of server tasks running to completion on said one server based on choosing an optimum path for accessing data from an intermediary table for updating said data in said base table of said database.

8. The method according to claim 6, wherein said second script monitors a total number of server tasks running on said one server and submits said next server task of said plurality of server tasks when a total number of server tasks running on said one server is less than said predetermined maximum number of server tasks that said one server can run.

9. The method according to claim 6, wherein said generating step comprises the steps of:
creating an individual log file corresponding to said each server task of said plurality of server tasks subsequent to completion of said all server tasks of said plurality of server tasks on said one server; and
identifying in said collective log file a summary for each of said individual log files created for said each server task of said plurality of server tasks subsequent to completion of said all server tasks of said plurality of server tasks on said one server.

10. A computer system consisting essentially of one server that has loaded therein a computer program product for processing data in a database, said computer system comprising:
a central processing unit;
first program instructions to initiate a plurality of server tasks to process data in a base table of said database of said computer system, wherein said plurality of server tasks run contemporaneously on said computer system, said first program instructions including instructions to retrieve a maximum number of server tasks that can be run on said computer system at any given time, and wherein said plurality of server tasks initiated consists essentially of a single type of server task chosen from a server task group comprised of: import task, export task, delete task, merge task and update task;
wherein said first instructions include instructions to specify one or more parameters for said plurality of server tasks in a driver file, said one or more parameters including said maximum number of server tasks that can be run on said one server at said any given time, and to test whether one or more parameters for said plurality of server tasks are passed as arguments and to check whether said one or more parameters exist before initiating said plurality of server tasks to be run contemporaneously on said computer system;
second program instructions to automate a collection of statistics associated with and subsequent to completion of a first batch of said plurality of server tasks running to completion on said computer system, wherein said statistics collected optimize performance of any remaining batches of said plurality of server tasks running to completion, based on choosing an optimum path for accessing data from an intermediary table for processing said data into a base table of said computer system; and
third program instructions to automatically submit a next server task of said plurality of server tasks when one server task of said plurality of server tasks has been processed, until each server task of said plurality of server tasks is completed for processing said data in said base table of said database of said computer system; wherein said third instructions include instructions to queue said next server task of said plurality of server tasks when a number of server tasks running is less than said plurality of server tasks to be run contemporaneously and to start said next server task of said plurality of server tasks only when a total number of server tasks running on said one server is less than said maximum number of server tasks that can run on said one server, until each of said plurality of server tasks are run to completion, wherein said first, second and third program instructions are stored on said computer system for execution by said central processing unit.

11. A computer system according to claim 10, further comprising:
fourth program instructions to generate a log file summarizing an outcome for said each server task of said plurality of server tasks subsequent to completion of all server tasks of said plurality of server tasks, wherein said fourth program instructions are stored on said computer system for execution by said central processing unit.

12. A computer system according to claim 10, wherein said first instructions comprise instructions to test whether one or more parameters for said plurality of server tasks are passed as arguments and to check whether said one or more parameters exist before initiating said plurality of server tasks to be run contemporaneously on said computer system.

* * * * *